Figure 4:
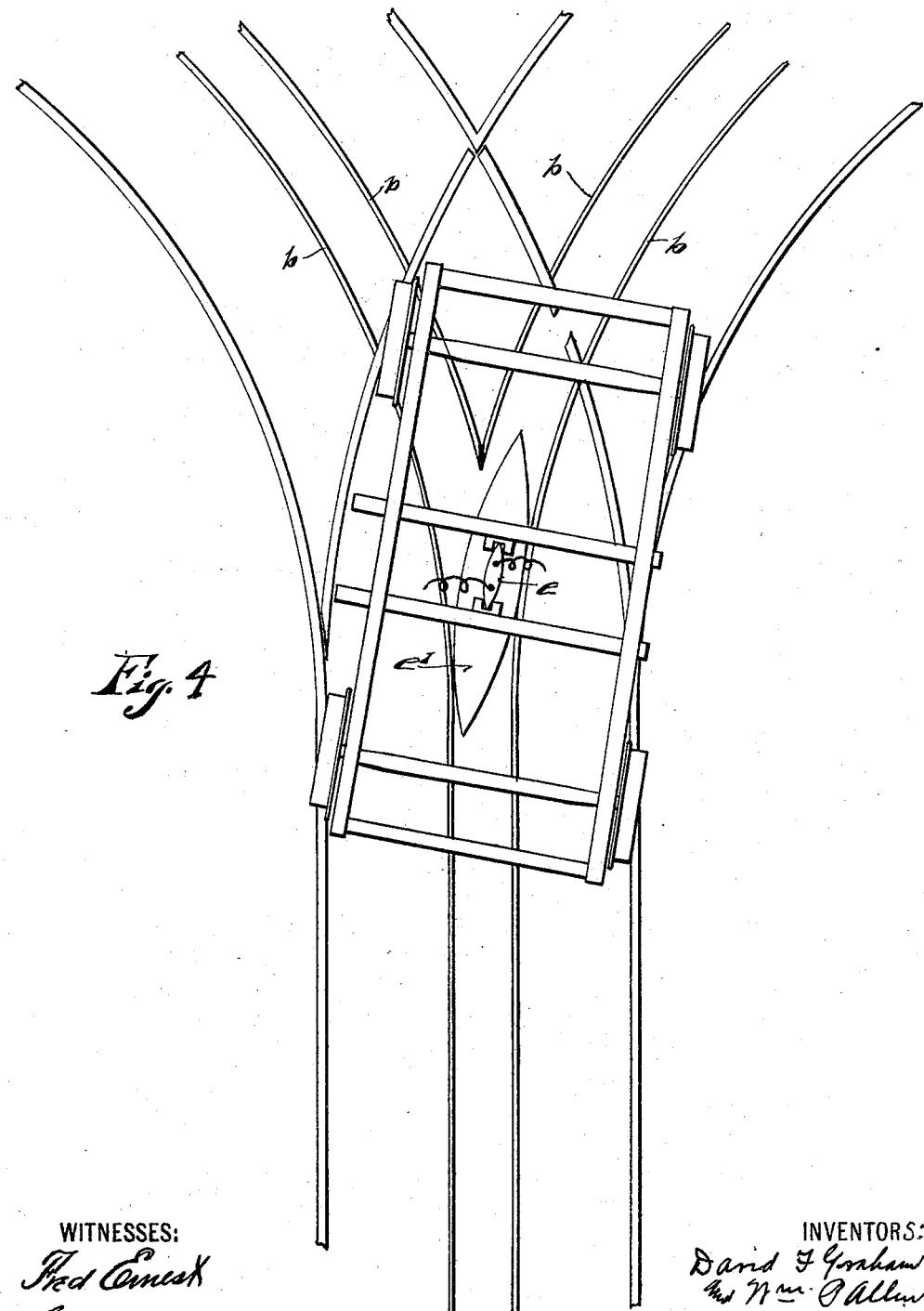

(No Model.) 3 Sheets—Sheet 1.
D. F. GRAHAM & W. P. ALLEN.
UNDERGROUND ELECTRIC RAILWAY.
No. 545,070. Patented Aug. 27, 1895.
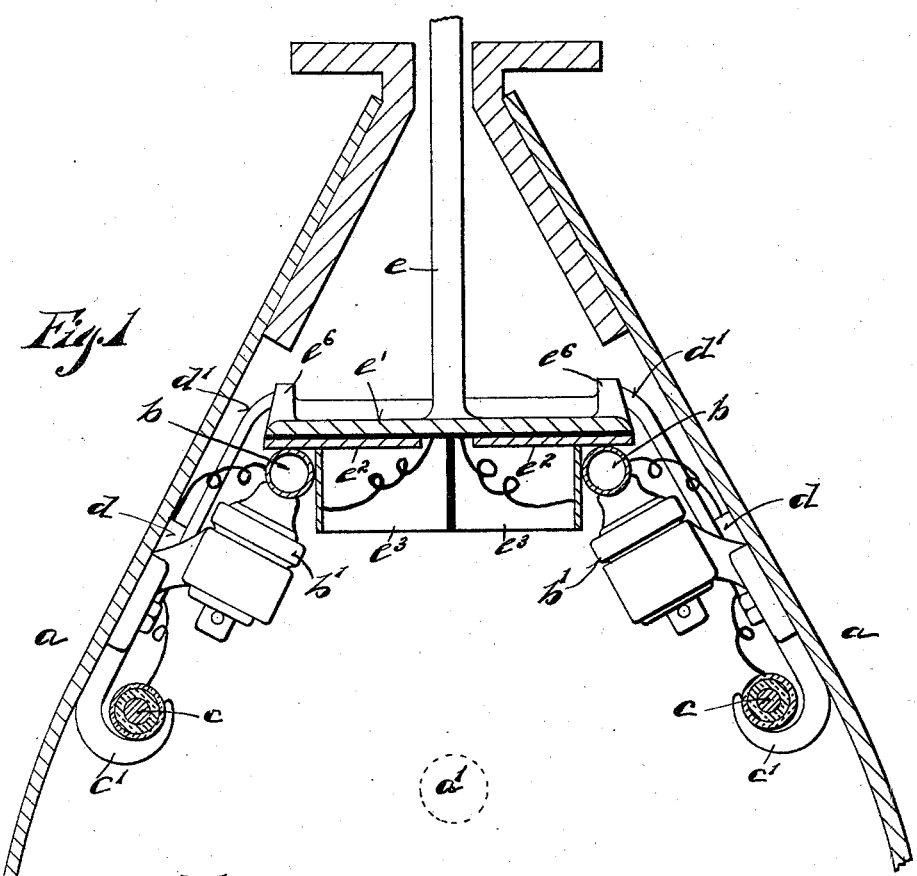
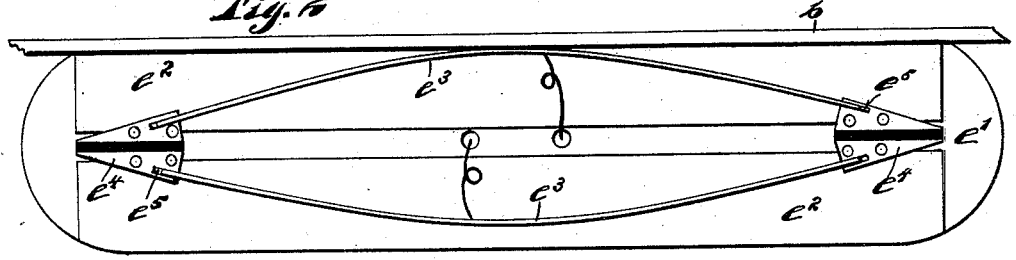
WITNESSES:
INVENTORS:
David F. Graham
and Wm. P. Allen
BY
ATTORNEYS (No Model.) 3 Sheets—Sheet 2.
D. F. GRAHAM & W. P. ALLEN.
UNDERGROUND ELECTRIC RAILWAY.
No. 545,070. Patented Aug. 27, 1895.
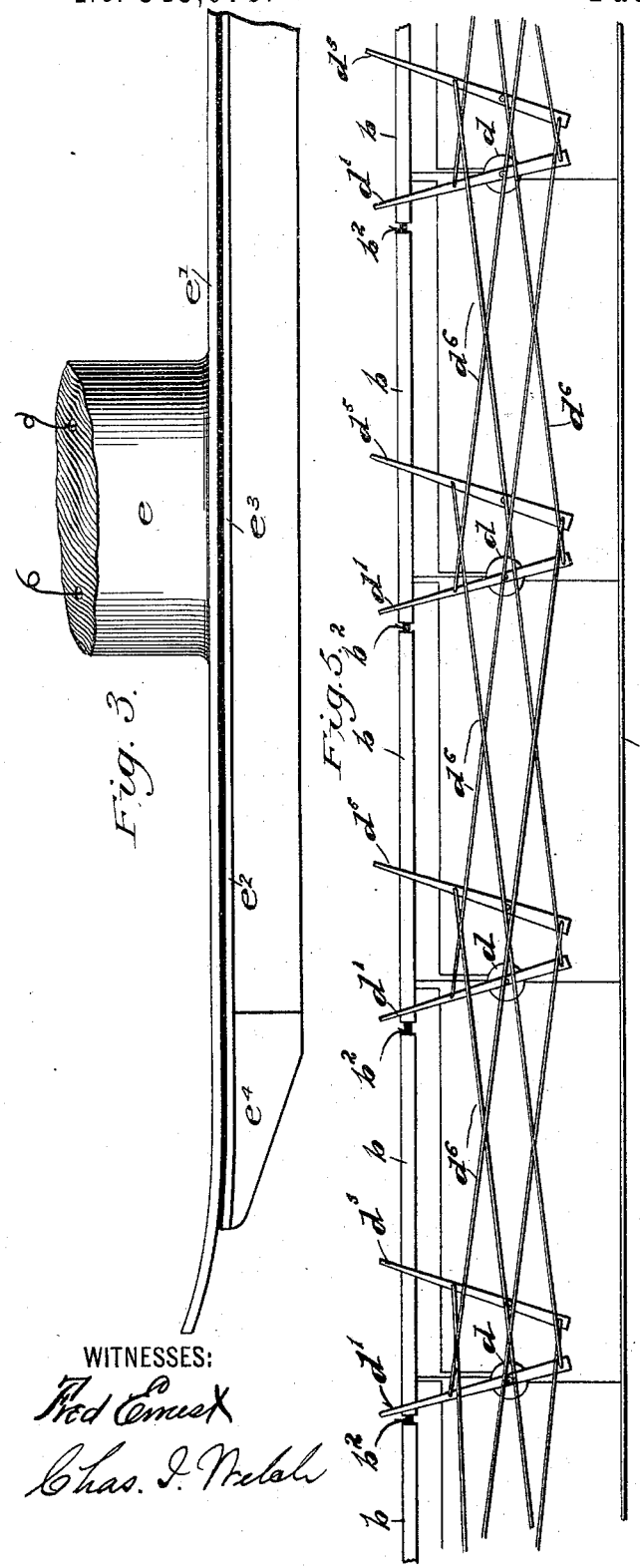
WITNESSES:
INVENTORS:

(No Model.) 3 Sheets—Sheet 3.

D. F. GRAHAM & W. P. ALLEN.
UNDERGROUND ELECTRIC RAILWAY.

No. 545,070. Patented Aug. 27, 1895.

WITNESSES:

INVENTORS:

BY

ATTORNEYS

UNITED STATES PATENT OFFICE.

DAVID F. GRAHAM, OF SPRINGFIELD, OHIO, AND WILLIAM P. ALLEN, OF CHICAGO, ILLINOIS, ASSIGNORS OF ONE-THIRD TO OLIVER S. KELLY, OF SPRINGFIELD, OHIO.

UNDERGROUND ELECTRIC RAILWAY.

SPECIFICATION forming part of Letters Patent No. 545,070, dated August 27, 1895.

Application filed June 21, 1894. Serial No. 515,255. (No model.)

*To all whom it may concern:*

Be it known that we, DAVID F. GRAHAM, residing at Springfield, Clark county, Ohio, and WILLIAM P. ALLEN, residing at Chicago, Cook county, Illinois, citizens of the United States, have invented certain new and useful Improvements in Underground Electric Railways, of which the following is a specification.

Our invention relates to improvements in underground systems for electric railways; and the object of our invention is to provide a system of conductors and electrical connections which shall be particularly adapted for use in ordinary conduits now employed in cable railways, the special object of the invention being to provide a system for electrical railways which will permit said railways to be operated either by electrical energy or by the motive power transmitted through the means of a moving cable.

We attain these objects by the constructions illustrated in the accompanying drawings, in which—

Figure 1 is an enlarged sectional elevation of a portion of a conduit to which our invention is shown applied. Fig. 2 is a bottom plan view of the contacting device and the conductors. Fig. 3 is a side elevation of the contacting device. Fig. 4 is a plan view showing the method of forming the conductors at switches or turn-outs. Fig. 5 is a side elevation or diagram of the switches and connections, showing a modification. Fig. 6 is a detail of the same.

Like parts are represented by similar letters of reference throughout the several views.

In the said drawings, $a\ a$ represent a conduit, which is of a size and shape as now used for cable railways, the position of the cable in operation being shown in dotted lines at $a'$.

Arranged on either side of the conduit and preferably near the top, so as to be out of the way of the grip device which operates in connection with the cable, are the conductors $b\ b$, which are supported in suitable insulating devices $b'\ b'$, attached to each side of the conduit. These conductors $b\ b$ are preferably formed of metallic tubes, joined together in sections by insulating-blocks $b^2$, each section being thus insulated from the other sections. Immediately below these insulating-supports $b'$ and also connected to the side of the conduit are feed-wires $c\ c$, which are preferably hung in supporting-hooks $c'$, secured to the side of the conduit. These feed-wires $c\ c$ are insulated and are connected at intervals through suitable contacting devices $d$ with the respective sections of the conductors $b\ b$, the contacting devices $d$ being in the nature of switches and operated by a moving car, so as to cut in and cut out the respective conductor-sections with the feed-wires $c\ c$.

Each motor-car which operates on the railway-track is provided with a contacting device, supported from the bottom of the car by a suitable supporting-stem $e$, adapted to pass through the slotted opening of the conduit $a\ a$. This contacting device consists essentially of a plate $e'$, having at the bottom thereof metallic shoes or plates $e^2$ and contacting-springs $e^3$. These springs $e^3$ consist essentially of curved metallic strips set at right angles to the shoes or plates $e^2$ and supported at each end in supporting-blocks $e^4$, having slotted openings $e^5$ to receive the ends of said springs. These blocks $e^4$, as well as the shoes or plates $e^2$, are insulated from each other and from the main supporting-plate $e'$, the ends of the spring contacting devices $e^3$ being inserted into the slotted openings $e^5$ of the supporting-block $e^4$ in such a manner as will permit the spring contacting devices to be closed together more or less, the natural resiliency of the said spring-contacting devices causing them to stand sufficiently apart to contact with the conductors $b\ b$, between which the said contacting device is adapted to move. The contacting device is thus made in the form of a shuttle pointed at each end, the conductors arranged on each side of said shuttle being constantly in contact with the two metallic springs, which are connected by suitable conductors through the stem $e$ to the motive power. By this construction the crossing of the conductors at switches or turn-outs is obviated, the conductors on one side of each branch being formed continuous, while the other conductors of each branch are brought together and insulated, as shown in Fig. 4, in such a manner that as the shuttle leaves one part of one conductor it contacts with the other part of the same conductor, while the contact with the conductor of opposite polarity remains unbroken.

As before stated, the respective sections of the conductor $b$ are connected through suitable contacting devices $d$ to the feed-wires $c$. Each of these contacting devices $d$ is provided with a suitable switch-lever $d'$, carrying suitable springs or circuit-breakers $d^2$, adapted to contact with the terminals $d^3$ $d^4$, to which the conductors $b$ and feed-wires $c$ are connected, respectively. For each switch-lever $d'$ there is also provided an auxiliary lever $d^5$, and each of these levers is adapted to contact with suitable projections $e^6$ on the plate $e'$, the auxiliary levers $d^5$ being connected to the switch-levers $d'$ by suitable connecting-rods or guides $d^6$, so that a movement of one lever produces a corresponding movement of the other lever, the arrangement being such that each conductor-section $b$ is, by the movement of the switch-lever, thrown into electrical connection with the feed-wire $c$ prior to the time the car enters on that section, said section being thrown out of electrical connection with the feed-wire after the contacting device on the car leaves said section, the conductor-sections thus being in electrical circuit with the source of energy only at such times as the contacting device is in contact with or approaching said conductor. The auxiliary lever $d^5$ of each switch-lever $d'$ is located beyond the next succeeding switch-lever, so that one switch-lever is always operated to cut in the next succeeding section before the preceding switch-lever is operated to cut out the preceding section.

In order to insure the proper electrical connection between the feed-wire and the conductor-sections and to prevent a conductor-section from being thrown out of circuit while a car is thereon—for instance, by another car on the same section—I preferably connect each conductor-section with two switches, as shown in Figs. 5 and 6, and place the auxiliary switch-levers $d^5$ two switches ahead or behind, as the case may be, of the switch operated thereby. By this arrangement each switch-lever cuts in two sections, and each section is operated by two switches, so even though one of said switches should be operated to disconnect said sections or one of them the said section would still remain in electrical connection through the other switch, so that the possibility of leaving the contacting device between sections of conductor which were not in electrical communication with the feeding-wires is avoided.

It should be stated that the shuttle which forms the contacting device hangs between the conductors at all times, and is prevented from passing through said conductors by the metallic plates or shoes $e^2$, arranged on the supporting-plate $e'$, the metallic shoes or plates $e^2$ being in electrical connection with the springs and forming a part of the contacting device. By this construction the necessity of an auxiliary supporting device for carrying the contacting devices over intervening spaces at crossings or turn-outs is obviated. The shuttle or contacting device is formed of sufficient length to bridge over these intervening spaces, and, as in every case one or more of the conductors must be made continuous the shuttle will be supported so as to pass over the intervening space without dropping through or breaking the contact.

It will be seen from the above description that an extremely simple underground system for electrical railways is secured. The main conductors may be supported by a simple form of insulators, which may be connected directly to the side of the conduit, with the feed-wires running along the sides of said conduit from which they are supported. By the arrangement of the shuttle-shaped spring contacting device a positive contact is secured, which is adapted to automatically adjust itself to curves, switches, or turn-outs.

Having thus described our invention, we claim—

1. The combination with the main conductors formed in insulated sections, as described, and a contacting device moving between said conductors, feeding wires having branches extending to said conductors, and switches in said branches, switch levers for operating said switches adapted to be moved by said contacting device, and auxiliary levers for operating said switch levers, said switch levers being each adapted to form an electrical connection from said feed wires to two sections of said conductor, substantially as specified.

2. The combination with a conductor supported in a conduit, as described, of a contacting device consisting essentially of a main supporting plate, metallic shoes or plates insulated from said supporting plate, bearing supports in contact with said plates or shoes, and contacting springs each supported in slotted openings in said bearing supports, said contacting springs being curved outwardly at the center and adapted to contact directly with the conductors, substantially as specified.

3. A contacting device for underground systems which consists essentially of a supporting plate arranged in a horizontal plane, metallic shoes parallel with said plate but insulated therefrom, contacting springs arranged at right angles to said shoes or plates and supported at the ends in slotted bearings, said springs being curved outwardly to form an elliptic or shuttle-shaped contacting device adapted to fit between the conductors and bear laterally against the same while the shoes rest in contact with said conductors and on top of the same, substantially as specified.

4. In an electric railway, a conduit having conductors therein, said conductors being arranged on each side of said conduit, and a contacting device consisting essentially of bowed contacting springs supported at each end in bearings so as to form a shuttle-shaped contacting device, as described, said contacting springs being supported on a main supporting plate having bearing shoes at right angles to said springs, said shoes being extended laterally beyond the contacting sides of said springs so as to rest on the top of the conductors while said springs are in contact with the sides of said conductors, substantially as specified.

In testimony whereof we have hereunto set our hands this 11th day of June, A. D. 1894.

DAVID F. GRAHAM.
WILLIAM P. ALLEN.

Witnesses for David F. Graham:
OLIVER H. MILLER,
CHAS. I. WELCH.

Witnesses for William P. Allen:
C. W. BAKER,
S. W. BELKNAP.